United States Patent
Nelson et al.

(10) Patent No.: US 10,011,740 B2
(45) Date of Patent: *Jul. 3, 2018

(54) ROSIN ESTERS AND COMPOSITIONS THEREOF

(71) Applicant: ARIZONA CHEMICAL COMPANY, LLC, Jacksonville, FL (US)

(72) Inventors: Lloyd A Nelson, Savannah, GA (US); Paul A Williams, Savannah, GA (US); Harry Jerrold Miller, Savannah, GA (US); Marc de Pater, Houton (NL); Lien Phun, Port Wentworth, GA (US)

(73) Assignee: Kraton Chemical, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/025,081

(22) PCT Filed: Sep. 26, 2014

(86) PCT No.: PCT/US2014/057674
§ 371 (c)(1),
(2) Date: Mar. 25, 2016

(87) PCT Pub. No.: WO2015/048415
PCT Pub. Date: Apr. 2, 2015

(65) Prior Publication Data
US 2016/0264821 A1 Sep. 15, 2016

Related U.S. Application Data

(60) Provisional application No. 61/883,725, filed on Sep. 27, 2013.

(51) Int. Cl.
| | | |
|---|---|---|
| C09J 7/02 | (2006.01) | |
| C09F 1/04 | (2006.01) | |
| C08L 93/04 | (2006.01) | |
| C09J 193/04 | (2006.01) | |
| C09D 193/04 | (2006.01) | |

(52) U.S. Cl.
CPC ............... *C09F 1/04* (2013.01); *C08L 93/04* (2013.01); *C09D 193/04* (2013.01); *C09J 193/04* (2013.01)

(58) Field of Classification Search
CPC ......... C09F 1/04; C09J 193/04; C09D 193/04
USPC ........................................................ 524/271
See application file for complete search history.

(56) References Cited

U.S. PATENT DOCUMENTS

| | | |
|---|---|---|
| 1,820,265 A | 8/1931 | Bent et al. |
| 2,051,796 A | 8/1936 | Humphrey |
| 2,239,555 A | 4/1941 | Fleck et al. |
| 2,729,660 A | 1/1956 | Harrison |
| 2,749,614 A | 6/1956 | Volkel |
| 3,310,575 A | 3/1967 | Spivack |
| 3,423,389 A | 1/1969 | Wheelus |
| 3,780,013 A | 12/1973 | Smith |
| 3,959,410 A | 5/1976 | DiRossi |
| 4,172,070 A | 10/1979 | Scharrer et al. |
| 4,302,371 A | 11/1981 | Matsuo et al. |
| 4,377,510 A | 3/1983 | Ruckel et al. |
| 4,380,513 A | 4/1983 | Ruckel et al. |
| 4,548,746 A | 10/1985 | Duncan et al. |
| 4,585,584 A | 4/1986 | Johnson, Jr. et al. |
| 4,657,703 A | 4/1987 | Durkee |
| 4,690,783 A | 9/1987 | Johnson, Jr. |
| 4,693,847 A | 9/1987 | Johnson, Jr. |
| 4,725,384 A | 2/1988 | Du Vernet |
| 4,744,925 A | 5/1988 | Lampo et al. |
| 4,788,009 A | 11/1988 | Johnson, Jr. |
| 4,847,010 A | 7/1989 | Maeda et al. |
| 5,021,548 A | 6/1991 | Minn |
| 5,036,129 A | 7/1991 | Atwell et al. |
| 5,049,652 A | 9/1991 | Minn |
| 5,504,152 A | 4/1996 | Schluenz et al. |
| 5,543,110 A | 8/1996 | Starr et al. |
| 6,989,413 B2 | 1/2006 | Hazen et al. |
| 2011/0213120 A1 | 9/2011 | Astrologes |

FOREIGN PATENT DOCUMENTS

| | | |
|---|---|---|
| CN | 103002321 A | 4/2011 |
| EP | 2824154 A1 | 1/2015 |
| JP | 7-11194 | 1/1995 |
| JP | 2009-84421 | 4/2009 |
| JP | 2009084421 A * | 4/2009 |
| JP | 2009-161573 | 7/2009 |
| WO | 2013/133407 A1 | 9/2013 |

OTHER PUBLICATIONS

International Search Report and Written Opinion dated Jun. 2, 2015, as issued in PCT Application No. PCT/US2014/057685 filed Sep. 26, 2014.

(Continued)

*Primary Examiner* — Hui Chin
(74) *Attorney, Agent, or Firm* — Samantha Page; Cantor Colburn LLP

(57) ABSTRACT

Rosin esters are provided. The rosin esters can exhibit improved color (e.g., the rosin ester can have a neat Gardner color of 4 or less), improved oxidative stability (e.g., when 1000 ppm or less of an antioxidant is present in combination with the rosin ester, the rosin ester can exhibit an oxidative-induction time at 130° C. of at least 30 minutes), improved color stability (e.g., the rosin ester can retain a neat Gardner color of 5 or less when heated to a temperature of 160° C. for a period of three hours), or combinations thereof. Also provided polymeric compositions comprising the rosin esters, as well as methods of making the rosin esters.

6 Claims, No Drawings

(56) References Cited

OTHER PUBLICATIONS

International Search Report and Written Opinion dated Jun. 2, 2015, as issued in PCT Application No. PCT/US2014/057691 filed Sep. 26, 2014.
CABOT: "Norit AZO", Cabot Technical Data Sheets, Jul. 17, 2007, XP002735930.

* cited by examiner

ROSIN ESTERS AND COMPOSITIONS THEREOF

TECHNICAL FIELD

This application relates generally to rosin esters, as well as methods of making and using thereof.

BACKGROUND

Rosin esters, including rosin esters derived from polyhydric alcohols, have been known for more than 50 years. See, for example, U.S. Pat. No. 1,820,265 to Bent, et al. Rosin esters are typically formed by the reaction of rosin. Which is primarily a mixture of isomeric $C_{20}$ tricyclic monocarboxylic acids known as rosin acids, with alcohols such as glycerol or pentaerythritol. The resultant rosin esters serve as additives in a variety of applications, including as tackifiers in hot-melt and pressure-sensitive adhesives, modifiers for rubbers and various plastics, emulsifiers for synthetic rubbers, base materials for chewing gum, resins in coating compositions such as traffic paints and inks, and sizing agents for paper making.

While suitable for many applications, many existing rosin esters fail to possess suitable properties for particular applications. Notably, many commercially available rosin esters are colored (e.g., yellow or yellowish brown) and exhibit poor stability. Accordingly, there continues to be a need for rosin esters which exhibit improved color (e.g., are colorless or nearly colorless) and improved stability.

SUMMARY

Provided herein are rosin esters that include at least 70% by weight of an esterified dehydroabietic acid and an esterified dihydroabietic acid. The weight ratio of the esterified dehydroabietic acid to the esterified dihydroabietic acid in the rosin ester can range from 1.3:1 to 1:2.6 (e.g., from 1.3:1 to 1:2.5, from 1.3:1 to 1:1.6, or from 1.2:1 to 1:1.5). The rosin esters can be derived from tall oil rosin, gum rosin, wood rosin, or a combination thereof. In some cases, the rosin ester is also derived from a polyhydric alcohol, such as a polyhydric alcohol selected from the group consisting of ethylene glycol, propylene glycol, diethylene glycol, triethylene glycol, tetraethylene glycol, trimethylene glycol, glycerol, trimethylolpropane, trimethylolethane, pentaerythritol, mannitol, and combinations thereof.

The rosin esters can be colorless or nearly colorless. For example, the rosin ester can have a neat Gardner color of 4 or less (e.g., 1.5 or less, or 1 or less). The rosin esters can have improved color stability (e.g., the rosin ester can retain a neat Gardner color of 5 or less when heated to a temperature of 160° C. for a period of three hours). The rosin esters can also exhibit improved oxidative stability (e.g., when 1000 ppm or less of an antioxidant is present in combination with the rosin ester, the rosin ester can exhibit an oxidative-induction time at 130° C. of at least 30 minutes).

Also provided are polymeric compositions comprising a polymer derived from one or more ethylenically-unsaturated monomers, or a blend of two or more such polymers, and a rosin ester. The polymer can be a homopolymer or a copolymer (e.g., a random copolymer or a block copolymer) derived from one or more ethylenically-unsaturated monomers, such as (meth)acrylate monomers, vinyl aromatic monomers (e.g., styrene), vinyl esters of carboxylic acids, (meth)acrylonitriles, vinyl halides, vinyl ethers, (meth)acrylamides and (meth)acrylamide derivatives, ethylenically unsaturated aliphatic monomers (e.g., ethylene, butylene, butadiene), and combinations thereof. In some embodiments, the rosin ester includes more than one type of rosin ester.

In some embodiments, the polymer derived from one or more ethylenically-unsaturated monomers comprises a copolymer of ethylene and n-butyl acrylate. In some embodiments, the polymer derived from one or more ethylenically-unsaturated monomers comprises a copolymer of styrene and one or more of isoprene and butadiene. In certain embodiments, the polymer derived from one or more ethylenically-unsaturated monomers comprises a polymer derived from vinyl acetate. Polymers derived from vinyl acetate include polymers derived, at least in part, from polymerization of vinyl acetate monomers. For example, the polymer derived from vinyl acetate can be a homopolymer of vinyl acetate (i.e., polyvinyl acetate; PVA). The polymer derived from vinyl acetate can also be a copolymer of vinyl acetate and one or more additional ethylenically-unsaturated monomers (e.g., poly(ethylene-co-vinyl acetate), EVA). In certain embodiments, the composition is a hot-melt adhesive, such as an EVA-based hot-melt adhesive.

In some embodiments, the polymer is present in the composition in an amount ranging from 20% to 60% by weight, based on the total weight of the composition (e.g., from 30% to 40% by weight). In some embodiments, the rosin ester is present in the composition in an amount ranging from 20% to 50% by weight, based on the total weight of the composition from 30% to 40% by weight). In certain embodiments, the weight ratio of the polymer to the total amount of esterified dehydroabietic acid and esterified dihydroabietic acid in the composition is from 1:2.2 to 4.3:1 (e.g., from 1:1.1 to 2:1).

The polymeric compositions can exhibit improved thermal stability, including improved viscosity stability on aging at elevated temperatures (thermal aging), improved color stability on thermal aging, or combinations thereof. For example, in some embodiments, the composition exhibits a change in viscosity of less than 5% when heated to a temperature of 177° C. for a period of 96 hours. In some cases, the composition exhibits a change of 5 or less Gardner color units when heated to a temperature of 177° C. for a period of 96 hours.

Also provided are methods of making rosin esters. Methods of making rosin esters can comprise (a) esterifying as rosin with an alcohol to provide a crude rosin ester, and (b) hydrogenating the crude rosin ester to form the rosin ester.

Esterification step (a) can comprise contacting a rosin with a suitable alcohol under suitable conditions to provide the crude rosin ester. The rosin can be selected from the group consisting of tall oil rosins, gum rosins, wood rosins, or combinations thereof. In some embodiments, the alcohol comprises a polyhydric alcohol, such as ethylene glycol, propylene glycol, diethylene glycol, triethylene glycol, tetraethylene glycol, trimethylene glycol, glycerol, trimethylolpropane, trimethylolethane, pentaerythritol, dipentaerythritol, mannitol, and combinations thereof. Hydrogenation step (b) can comprise contacting the crude rosin ester with a hydrogenation catalyst. Step (b) can be performed at an elevated temperature, an elevated pressure, or combinations thereof.

Optionally, a solvent can be present in esterification step (a), hydrogenation step (b), or combinations thereof. In certain embodiments, the rosin esterified in step (a) and/or the crude rosin ester hydrogenated in step (b) comprise less than 25% by weight solvent. In some embodiments, the concentration of esterified rosin acids in the crude rosin ester hydrogenated in step (b) is 75% or more by weight, based on the total weight of the crude rosin ester. In some embodiments, the crude rosin ester is substantially free of solvent (e.g., the crude rosin ester comprises less than 1% by weight solvent, based on the total weight of the crude rosin ester). In certain embodiments, the crude rosin ester hydrogenated in step (b) has a viscosity of 1,000 cP or less at 25° C.

In some embodiments, the crude rosin ester obtained from esterification step (a) is hydrogenated in step (b) without an intervening distillation step. In certain embodiments, the crude rosin ester obtained from esterification step (a) is hydrogenated in step (b) without any intervening purification step.

In some cases, methods of making the rosin esters described herein include only a single hydrogenation step. In some embodiments, methods of making the rosin esters described herein consist essentially of esterifying step (a) and hydrogenating step (b). In certain embodiments, methods of making the rosin esters described herein consist of esterifying step (a) and hydrogenating step (b).

In certain embodiments, methods of making rosin esters can further comprise disproportionating the rosin prior to the esterifying step (a). The step of disproportionating the rosin can comprise contacting the rosin with a disproportionation catalyst, such as a phenol sulfide-type disproportionation catalyst.

DETAILED DESCRIPTION

Provided herein are rosin esters. The rosin esters can exhibit improved color (e.g., the rosin ester can have a neat Gardner color of 4 or less), improved oxidative stability (e.g., when 1000 ppm or less of an antioxidant is present in combination with the rosin ester, the rosin ester can exhibit an oxidative-induction time at 130° C. of at least 30 minutes), improved color stability (e.g., the rosin ester can retain a neat Gardner color of 5 or less when heated to a temperature of 160° C. for a period of three hours), or combinations thereof.

Rosin esters can be formed by the esterification of rosin. Rosin, also called colophony or Greek pitch (Pix græca), is a solid hydrocarbon secretion of plants, typically of conifers such as pines (e.g., Pinus palustris and Pinus caribaea). Rosin can include a mixture of rosin acids, with the precise composition of the rosin varying depending in part on the plant species. Rosin acids are $C_{20}$ fused-ring monocarboxylic acids with a nucleus of three fused six-carbon rings containing double bonds that vary in number and location. Examples of rosin acids include abietic acid, neoabietic acid, dehydroabietic acid, dihydroabietic acid, pimaric acid, levopimaric acid, sandaracopimaric acid, isopimaric acid, and palustric acid. Natural rosin typically consists of a mixture of seven or eight resin acids, in combination with minor amounts of other components.

Rosin is commercially available, and can be obtained from pine trees by distillation of oleoresin (gum rosin being the residue of distillation), by extraction of pine stumps (wood rosin) or by fractionation of tall oil (tall oil rosin). Any type of rosin can be used to prepare the rosin esters described herein, including tall oil rosin, gum rosin and wood rosin and mixtures thereof. In certain embodiments, the rosin ester is derived from tall oil rosin. Examples of commercially available rosins include tall oil rosins such as SYLVAROS® 90, commercially available from Arizona Chemical.

As described above, rosin includes a mixture of rosin acids (e.g., abietadienoic acids) which can include conjugated double bonds within their ring systems. These conjugated double bonds can be a source of oxidative instability. Accordingly, in some cases, the rosin, rosin ester, or combinations thereof are processed to decrease the weight percent of components which include conjugated double bonds. For example, the PAN number of rosin or a rosin ester refers to the weight percentage of abietadienoic acids (in particular palustric, abietic and neoabietic acids) present in the rosin or rosin ester, based on the total weight of the rosin or rosin ester. The term "PAN number", as used herein, specifically refers to the sum of the weight percentages of palustric, abietic and neoabietic acid moieties in a rosin or rosin ester, as determined according to method described in ASTM D5974-00 (2010).

The rosin ester can have a low PAN number. In some embodiments, the rosin ester can have a PAN number, as determined according to the method described in ASTM D5974-00 (2010), of 15.0 or less (e.g., 14.5 or less, 14.0 or less, 13.5 or less, 13.0 or less, 12.5 or less, 12.0 or less, 11.5 or less, 11.0 or less, 10.5 or less, 10.0 or less, 9.5 or less, 9.0 or less, 8.5 or less, 8.0 or less, 7.5 or less, 7.0 or less, 6.5 or less, 6.0 or less, 5.5 or less, 5.0 or less, 4.5 or less, 4.0 or less, 3.5 or less, 3.0 or less, 2.5 or less, 2.0 or less, 1.5 or less, or 1.0 or less).

The rosin ester can comprise at least 70% by weight of an esterified dehydroabietic acid and an esterified dihydroabietic acid, based on the total weight of the rosin ester (e.g., at least 75% by weight of an esterified dehydroabietic acid and an esterified dihydroabietic acid, at least 80% by weight of an esterified dehydroabietic acid and an esterified dihydroabietic acid, at least 85% by weight of an esterified dehydroabietic acid and an esterified dihydroabietic acid, at least 90% by weight of an esterified dehydroabietic acid and an esterified dihydroabietic acid, or at least 95% by weight of an esterified dehydroabietic acid and an esterified dihydroabietic acid).

In some embodiments, the weight ratio of esterified dehydroabietic acid to esterified. dihydroabietic acid in the rosin ester is 1.3:1 or less (e.g., 1.25:1 or less, 1.2:1 or less, 1.15:1 or less, 1.1:1 or less, 1.05:1 or less, 1:1 or less, 1:1.05 or less, 1:1.1 or less, 1:1.15 or less, 1:1.2 or less, 1:1.25 or less, 1:1.3 or less, 1:1.35 or less, 1:1.4 or less, 1:1.45 or less, 1:1.5 or less, 1:1.55 or less, 1:1.6 or less, 1:1.65 or less, 1:1.7 or less, 1:1.75 or less, 1:1.8 or less, 1:1.85 or less, 1:1.9 or less, 1:1.95 or less, 1:2 or less, 1:2.05 or less, 1:2.1 or less, 1:2.15 or less, 1:2.2 or less, 1:2.25 or less, 1:2.3 or less, 1:2.35 or less, 1:2.4 or less; 1:2.45 or less, 1:2.5 or less, or 1:2.55). In some embodiments, the weight ratio of esterified dehydroabietic acid to esterified dihydroabietic acid in the rosin ester is at least 1:2.6 (e.g., at least 1:2.55, at least 1:2.5, at least 1:2.45, at least 1:2.4, at least 1:2.35, at least 1:2.3, at least 1:2.25, at least 1:2.2, at least 1:2.15, at least 1:2.1, at least 1:2.05, at least 1:2, at least 1:1.95, at least 1:1.9, at least 1:4.85, at least 1:1.8, at least 1:1.75, at least 1:1.7, at least 1:1.65, at least 1:1.6, at least 1:1.55, at least 1:1.5, at least 1:1.45, at least 1:1.4, at least 1:1.35, at least 1:1.3, at least 1:1.25, at least 1:1.2, at least 1:1.15, at least 1:1, at least 1:1.05, at least 1:1, at least 1.05:1, at least 1.1:1, at least 1.15:1, at least 1.2:1, or at least 1.25:1).

The weight ratio of esterified dehydroabietic acid to esterified dihydroabietic acid in the rosin ester can range from any of the minimum values described above to any of the maximum values described above. For example, the weight ratio of esterified dehydroabietic acid to esterified dihydroabietic acid in the rosin ester can range from 1.3:1 to 1:2.6 (e.g., from 1.3:1 to 1:2.5, from 1.3:1 to 1:1.6, or from 1.2:1 to 1:1.5).

The rosin ester can be derived from any suitable alcohol, include monoalcohols, diols, and other polyols. Examples of suitable alcohols include glycerol, pentaerythritol, dipentaerythritol, ethylene glycol, diethylene glycol, triethylene glycol, sorbitol, neopentylglycol, trimethylolpropane, methanol, ethanol, propanol, butanol, amyl alcohol, 2-ethyl hexanol, diglycerol, tripentaerythritol, $C_8$-$C_{11}$ branched or unbranched alkyl alcohols, and $C_7$-$C_{16}$ branched or unbranched arylalkylalcohols. In certain embodiments, the rosin ester is derived from a polyhydric alcohol. In certain embodiments, the polyhydric alcohol can be selected from the group consisting of ethylene glycol, propylene glycol, diethylene glycol, triethylene glycol, tetraethylene glycol, trimethylene glycol, glycerol, trimethylolpropane, trimethylolethane, pentaerythritol, dipentaerythritol, mannitol, and combinations thereof.

The rosin ester can have a weight average molecular weight, as determined using gel permeation chromatography (GPC) as described in ASTM D5296-05, of at least 800 g/mol (e.g., at least 850 g/mol, at least 900 g/mol, at least 950 g/mol, at least 1000 g/mol, at least 1050 g/mol, at least 1100 g/mol, at least 1150 g/mol, at least 1200 g/mol, at least 1250 g/mol, at least 1300 g/mol, at least 1350 g/mol, at least 1400 g/mol, at least 1450 g/mol, at least 1500 g/mol, at least 1550 g/mol, at least 1600 g/mol, at least 1650 g/mol, at least 1700 g/mol, at least 1750 g/mol, at least 1800 g/mol, at least 1850 g/mol, at least 1900 g/mol, or at least 1950 g/mol). The blend of rosin esters can have a weight average molecular weight of 2000 g/mol or less (e.g., 1950 g/mol or less, 1900 g/mol or less, 1850 g/mol or less, 1800 g/mol or less, 1750 g/mol or less, 1700 g/mol or less, 1650 g/mol or less, 1600 g/mol or less, 1550 g/mol or less, 1500 g/mol or less, 1450 g/mol or less, 1400 g/mol or less, 1350 g/mol or less, 1300 g/mol or less, 1250 g/mol or less, 1200 g/mol or less, 1150 g/mol or less, 1100 g/mol or less, 1050 g/mol or less, 1000 g/mol or less, 950 g/mol or less, 900 g/mol or less, or 850 g/mol or less).

The rosin ester can have a weight average molecular weight ranging from any of the minimum values above to any of the maximum values above. For example, the rosin ester can have a weight average molecular weight of from 800 g/mol to 2000 g/mol (e.g., from 900 g/mol to 1600 g/mol, or from 1000 g/mol to 1500 g/mol).

The rosin esters can have a low neat Gardner color. In some embodiments, the rosin ester has a neat Gardner color, as determined according to the method described in ASTM D1544-04 (2010), of 4.0 or less (e.g., 3.5 or less, 3.0 or less, 2.5 or less, 2.0 or less, 1.5 or less, 1.0 or less, or 0.5 or less).

In certain embodiments, the rosin esters can exhibit improved color stability. For example, the ester can retain a neat Gardner color of 5 or less (e.g., 4.5 or less, 4.0 or less, 3.5 or less, 3.0 or less, 2.5 or less, 2.0 or less, 1.5 or less, 1.0 or less, or 0.5 or less) when heated to a temperature of 160° C. for a period of three hours.

The rosin esters can also exhibit improved oxidative stability. For example, in some embodiments, when 1000 ppm or less of an antioxidant is present in combination with the rosin ester, the rosin ester can exhibit an oxidative-induction time at 130° C., as measured using the methods specified in ASTM D5483-05(2010), of at least 30 minutes (e.g., at least 31 minutes, at least 32 minutes, at least 33 minutes, at least 34 minutes, at least 35 minutes, at least 36 minutes, at least 37 minutes, at least 38 minutes, at least 39 minutes, at least 40 minutes, at least 41 minutes, at least 42 minutes, at least 43 minutes, at least 44 minutes, at least 45 minutes, at least 50 minutes, at least 55 minutes, at least 60 minutes, at least 65 minutes, at least 70 minutes, at least 75 minutes, or longer). For example, when the rosin ester includes 1000 ppm of antioxidant, or when the rosin ester includes less than 1000 ppm of antioxidant (e.g., 800 ppm of antioxidant, 600 ppm of antioxidant, 400 ppm of antioxidant, 200 ppm of antioxidant, 100 ppm of antioxidant, 50 ppm of antioxidant, or 0 ppm of antioxidant), the rosin ester can exhibit the oxidative-induction times described above at 130° C., as measured using the methods specified in ASTM D5483-05(2010). In some cases, when 1000 ppm or less of an antioxidant is present in combination with the rosin ester, the rosin ester can exhibit an oxidative-induction time at 130° C., as measured using the methods specified in ASTM D5483-05(2010), of 250 minutes or less (e.g., 200 minutes or less).

Optionally, the rosin esters can have a low hydroxyl number. In some embodiments, the rosin ester has a hydroxyl number, as measured using a modified version of the standard method provided in DIN 53240-2 (different solvent tetrahydrofuran was applied), of 5.0 or less (e.g., 4.5 or less, 4.0 or less, 3.5 or less, 3.0 or less, 2.5 or less, 2.0 or less, 1.5 or less, or 1.0 or less). The hydroxyl number is expressed as mg KOH per gram rosin ester sample.

The rosin ester can have a low acid number. In some embodiments, the rosin ester has an acid number, as determined according to the method described in ASTM D465-05 (2010), of 10.0 or less (e.g., 9.5 or less, 9.0 or less, 8.5 or less, 8.0 or less, 7.5 or less, 7.0 or less, 6.5 or less, 6.0 or less, 5.5 or less, 5.0 or less, 4.5 or less, 4.0 or less, 3.5 or less, 3.0 or less, 2.5 or less, 2.0 or less, 1.5 or less, or 1.0 or less). The acid number is expressed as mg KOH per gram rosin ester sample.

The rosin ester can optionally have low sulfur content. Sulfur content can be measured with an ANTEK® 9000 sulfur analyzer using the standard methods described in ASTM D5453-05. In some embodiments, the rosin ester comprises less than 400 ppm sulfur (e.g., less than 350 ppm sulfur, less than 300 ppm sulfur, less than 250 ppm sulfur, or less than 200 ppm sulfur).

Also provided are polymeric compositions comprising a rosin ester described herein and a polymer derived from one or more ethylenically-unsaturated monomers. In this context, a polymer derived from an ethylenically-unsaturated monomer includes polymers derived, at least in part, from polymerization of the ethylenically-unsaturated monomer. For example, a polymer derived from an ethylenically-unsaturated monomers can be obtained by, for example, radical polymerization of a monomer mixture comprising the ethylenically-unsaturated monomer. A polymer derived from an ethylenically-unsaturated monomer can be said to contain monomer units obtained by polymerization (e.g., radical polymerization) of the ethylenically-unsaturated monomer. Polymeric compositions can also comprise a rosin ester described herein and a blend of two or more polymers derived from one or more ethylenically-unsaturated monomers. In these cases, the blend of two or more polymers can be, for example, a blend of two or more polymers having different chemical compositions (e.g., a blend of poly(ethylene-co-vinyl acetate) and polyvinyl acetate; or a blend of two poly(ethylene-co-vinyl acetates) derived from different weight percents of ethylene and vinyl acetate monomers).

In some embodiments, the rosin ester includes more than one type of rosin ester. For example, the rosin ester can include a mixture of two rosin esters which are derived from the same type of rosin and two different alcohols (e.g., a pentaerythritol ester of tall oil rosin and a glycerol ester of tall oil rosin), a mixture of two rosin esters which are derived from the same alcohol and two different types of rosin (e.g., a pentaerythritol ester of tall oil rosin and a pentaerythritol ester of gum rosin), or a mixture of two rosin esters which are derived from two different alcohols and two different types of rosin (e.g., a pentaerythritol ester of tall oil rosin and a glycerol ester of gum rosin).

The polymer can be a homopolymer or a copolymer (e.g., a random copolymer or a block copolymer) derived from one or more ethylenically-unsaturated monomers. In other words, the homopolymer or copolymer can include monomer units of one or more ethylenically-unsaturated monomers. The polymer can be a branched polymer or copolymer. For example, polymer can be a graft copolymer having a polymeric backbone and a plurality of polymeric side chains grafted to the polymeric backbone. In some cases, the polymer can be a graft copolymer having a backbone of a first chemical composition and a plurality of polymeric side chains that are structurally distinct from the polymeric backbone (e.g., having a different chemical composition than the polymeric backbone) grafted to the polymeric backbone.

Examples of suitable ethylenically-unsaturated monomers include (meth)acrylate monomers, vinyl aromatic monomers (e.g., styrene), vinyl esters of a carboxylic acids, (meth)acrylonitriles, vinyl halides, vinyl ethers, (meth)acrylamides and (meth)acrylamide derivatives, ethylenically unsaturated aliphatic monomers (e.g., ethylene, butylene, butadiene), and combinations thereof. As used herein, the term "(meth)acrylate monomer" includes acrylate, methacrylate, diacrylate, and dimethacrylate monomers. Similarly, the term "(meth)acrylonitrile" includes acrylonitrile, methacrylonitrile, etc. and the term "(meth)acrylamide" includes acrylamide, methacrylamide, etc.

Suitable (meth)acrylate monomers include esters of α,β-monoethylenically unsaturated monocarboxylic and dicarboxylic acids having 3 to 6 carbon atoms with alkanols having 1 to 20 carbon atoms (e.g., esters of acrylic acid, methacrylic acid, maleic acid, fumaric acid, or itaconic acid, with $C_1$-$C_{20}$, $C_1$-$C_{12}$, $C_1$-$C_8$, or $C_1$-$C_4$ alkanols). Exemplary (meth)acrylate monomers include, but are not limited to, methyl acrylate, methyl (meth)acrylate, ethyl acrylate, ethyl (meth)acrylate, butyl acrylate, butyl (meth)acrylate, isobutyl (meth)acrylate, n-hexyl (meth)acrylate, ethylhexyl (meth) acrylate, n-heptyl (meth)acrylate, ethyl (meth)acrylate, 2-methylheptyl (meth)acrylate, octyl (meth)acrylate, isooctyl (meth)acrylate, n-nonyl (meth)acrylate, isononyl (meth) acrylate, n-decyl (meth)acrylate, isodecyl (meth)acrylate, dodecyl (meth)acrylate, lauryl (meth)acrylate, tridecyl (meth)acrylate, stearyl (meth)acrylate, glycidyl (meth)acrylate, alkyl crotonates, vinyl acetate, di-n-butyl maleate, di-octylmaleate, acetoacetoxyethyl (meth)acrylate, acetoacetoxypropyl (meth)acrylate, hydroxyethyl (meth)acrylate, allyl (meth)acrylate, tetrahydrofurfuryl (meth)acrylate, cyclohexyl (meth)acrylate, 2-ethoxyethyl (meth)acrylate, 2-methoxy (meth)acrylate, 2-(2-ethoxyethoxy)ethyl (meth) acrylate, 2-ethylhexyl (meth)acrylate, 2-propylheptyl (meth) acrylate, 2-phenoxyethyl (meth)acrylate, isobornyl (meth) acrylate, caprolactone (meth)acrylate, polypropyleneglycol mono(meth)acrylate, polyethyleneglycol (meth)acrylate, benzyl (meth)acrylate, 2,3-di(acetoacetoxy)propyl (meth) acrylate, hydroxypropyl (meth)acrylate, methylpolyglycol (meth)acrylate, 3,4-epoxycyclohexylmethyl (meth)acrylate, 1,6 hexanediol di(meth)acrylate, 1,4 butanediol di(meth) acrylate and combinations thereof.

Suitable vinyl aromatic compounds include styrene, α- and p-methylstyrene, α-butylstyrene, 4-n-butylstyrene, 4-n-decylstyrene, vinyltoluene, and combinations thereof. Suitable vinyl esters of carboxylic acids include vinyl esters of carboxylic acids comprising up to 20 carbon atoms, such as vinyl laurate, vinyl stearate, vinyl propionate, versatic acid vinyl esters, and combinations thereof. Suitable vinyl halides can include ethylenically unsaturated compounds substituted by chlorine, fluorine or bromine, such as vinyl chloride and vinylidene chloride. Suitable vinyl ethers can include, for example, vinyl ethers of alcohols comprising 1 to 4 carbon atoms, such as vinyl methyl ether or vinyl isobutyl ether. Aliphatic hydrocarbons having 2 to 8 carbon atoms and one or two double bonds can include, for example, hydrocarbons having 2 to 8 carbon atoms and one olefinic double bond, such as ethylene, as well as hydrocarbons having 4 to 8 carbon atoms and two olefinic double bonds, such as butadiene, isoprene, and chloroprene.

In some embodiments, the polymer derived from one or more ethylenically-unsaturated monomers comprises a copolymer of ethylene and n-butyl acrylate. In some embodiments, the polymer derived from one or more ethylenically-unsaturated monomers comprises a copolymer of styrene and one or more of isoprene and butadiene. In certain embodiments, the polymer derived from one or more ethylenically-unsaturated monomers comprises a metallocene-catalyzed polyolefin. Examples of suitable metallocene-catalyzed polyolefins include metallocene polyethylene homopolymers and metallocene polyethylene copolymers, which are commercially available, for example, from Exxon Mobil Corporation (under the trade name EXACT®) and Dow Chemical Company (under the trade name AFFINITY®).

In certain embodiments, the polymer derived from one or more ethylenically-unsaturated monomers comprises a polymer derived from vinyl acetate. Polymers derived from vinyl acetate include polymers derived, at least in part, from polymerization of vinyl acetate monomers. For example, the polymer derived from vinyl acetate can be a homopolymer of vinyl acetate (i.e., polyvinyl acetate; PVA). The polymer derived from vinyl acetate can also be a copolymer of vinyl acetate and one or more additional ethylenically-unsaturated monomers (e.g., poly(ethylene-co-vinyl acetate), EVA). In these embodiments, the polymer derived from vinyl acetate can be derived from varying amounts of vinyl acetate, so as to provide a polymer having the chemical and physical properties suitable for a particular application.

In some embodiments, the polymer derived from vinyl acetate is derived from at least 5% by weight vinyl acetate, based on the total weight of all of the monomers polymerized to form the polymer (e.g., at least 7.5% by weight, at least 9% by weight, at least 10% by weight, at least 11% by weight, at least 12% by weight, at least 13% by weight, at least 14% by weight, at least 15% by weight, at least 16% by weight, at least 17% by weight, at least 18% by weight, at least 19% by weight, at least 20% by weight, at least 21% by weight, at least 22% by weight, at least 23% by weight, at least 24% by weight, at least 25% by weight, at least 26% by weight, at least 27% by weight, at least 28% by weight, at least 29% by weight, at least 30% by weight, at least 31% by weight, at least 32% by weight, at least 33% by weight, at least 34% by weight, at least 35% by weight, at least 37.5% by weight, at least 40% by weight, at least 45% by weight, at least 50% by weight, at least 55% by weight, at least 60% by weight, at least 65% by weight, at least 70% by weight, at least 75% by weight, at least 80% by weight, at least 85% by weight, or at least 90% by weight). In some embodiments, the polymer derived from vinyl acetate is derived from 95% by weight or less vinyl acetate, based on the total weight of all of the monomers polymerized to form the polymer (e.g., 90% by weight or less, 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 37.5% by weight or less, 35% by weight or less, 34% by weight or less, 33% by weight or less, 32% by weight or less, 31% by weight or less, 30% by weight or less, 29% by weight or less, 28% by weight or less, 27% by weight or less, 26% by weight or less, 25% by weight or less, 24% by weight or less, 23% by weight or less, 22% by weight or less, 21% by weight or less, 20% by weight or less, 19% by weight or less, 18% by weight or less, 17% by weight or less, 16% by weight or less, 15% by weight or less, 14% by weight or less, 13% by weight or less, 12% by weight or less, 11% by weight or less, 10% by weight or less, 9% by weight or less, or 7.5% by weight or less).

The polymer derived from vinyl acetate can be a copolymer derived from an amount of vinyl acetate ranging from any of the minimum values above to any of the maximum values above. For example, the polymer derived from vinyl acetate can be a copolymer derived from 5% by weight to less than 100% by weight vinyl acetate, based on the total weight of all of the monomers polymerized to form the polymer (e.g., from 5% by weight to 75% by weight vinyl acetate, from 10% by weight to 40% by weight vinyl acetate, or from 17% by weight to 34% by weight vinyl acetate).

In the case of copolymers derived from vinyl acetate and one or more ethylenically-unsaturated monomers, any suitable ethylenically-unsaturated monomers can be incorporated in the copolymer, so as to provide a copolymer having the chemical and physical properties desired for a particular application. By way of example, suitable ethylenically-unsaturated monomers which can be incorporated into the copolymers include those described above, including (meth)acrylate monomers, vinyl aromatic monomers (e.g., styrene), vinyl esters of a carboxylic acids, (meth)acrylonitriles, vinyl halides, vinyl ethers, (meth)acrylamides and (meth)acrylamide derivatives, ethylenically unsaturated aliphatic monomers (e.g., ethylene, butylene, butadiene), and combinations thereof.

In certain embodiments, the polymer is poly(ethylene-co-vinyl acetate) (EVA). EVA is a copolymer derived from ethylene and vinyl acetate. EVA is widely used in a variety of applications, including as a copolymer in hot-melt adhesives, in road marking and pavement marking applications, in biomedical applications (e.g., as a matrix for controlled drug delivery), as an additive in plastic films, and as a foam in a variety of consumer products. Optionally, the EVA copolymer can be grafted with suitable olefinic monomers, such as butadiene, to obtain copolymers having the particular chemical and physical properties required for a particular application. See, for example, U.S. Pat. No. 3,959,410 to DiRossi and U.S. Pat. No. 5,036,129 to Atwell, et al.

In certain embodiments, the polymer is EVA derived from 9% by weight to less than 45% by weight vinyl acetate, based on the total weight of all of the monomers polymerized to form the polymer (e.g., from 17% by weight to 40% by weight vinyl acetate, from 17% by weight to 34% by weight vinyl acetate, or from 25% by weight to 30% by weight vinyl acetate) and from greater than 55% by weight to 91% by weight ethylene (e.g., from 60% by weight to 83% by weight vinyl acetate, from 66% by weight to 83% by weight vinyl acetate, or from 70% by weight to 75% by weight vinyl acetate). In one embodiment, the polymer derived from vinyl acetate is EVA derived from 26% by weight to 28% by weight vinyl acetate and from 72% by weight to 74% by weight ethylene, based on the total weight of all of the monomers polymerized to form the polymer.

In some embodiments, the polymer has a melting temperature, as measured by differential scanning calorimetry (DSC) using the standard method described in ISO 11357-3:2011, of greater than 25° C. (e.g., greater than 30° C., greater than 35° C., greater than 40° C., greater than 45° C., greater than 50° C., greater than 55° C., greater than 60° C., greater than 65° C., greater than 70° C., greater than 75° C., greater than 80° C., or greater than 85° C., greater than 90° C., or greater than 95° C.). The polymer derived from vinyl acetate can have a melting temperature of less than 100° C. (e.g., less than 95° C., less than 90° C., less than 85° C., less than 80° C., less than 75° C., less than 70° C., less than 65° C., less than 60° C., less than 55° C., less than 50° C., less than 45° C., less than 40° C., less than 35° C., or less than 30° C.)

The polymer can have a melting temperature ranging from any of the minimum values above to any of the maximum values above. For example, the polymer can have a melting temperature, as measured by differential scanning calorimetry (DSC) using the standard method described in ISO 11357-3:2011, of from 25° C. to 100° C. (e.g., from 25° C. to 90° C., from 35° C. to 85° C., or 50° C. to 80° C.).

The rosin ester can be present in the polymeric compositions in varying amounts, depending upon the desired properties of the composition. In some embodiments, the rosin ester comprises at least 5% by weight of the composition (e.g., at least 10% by weight of the composition, at least 15% by weight of the composition, at least 20% by weight of the composition, at least 25% by weight of the composition, at least 30% by weight of the composition, at least 35% by weight of the composition, at least 40% by weight of the composition, or at least 45% by weight of the composition). In some embodiments, the rosin ester comprises 50% or less of the composition by weight (e.g., 45% or less by weight, 40% or less by weight, 35% or less by weight, 30% or less by weight, 25% or less by weight, 20% or less by weight, 15% or less by weight, or 10% or less by weight). The rosin ester can be present in the composition in an amount ranging from any of the minimum values above to any of the maximum values above. In some embodiments, rosin ester is present in the composition in an amount ranging from 20% to 50% by weight, based on the total weight of the composition (e.g., from 30% to 40% by weight).

Similarly, the polymer derived from one or more ethylenically-unsaturated monomers can be present in the polymeric compositions in varying amounts, depending upon the desired properties of the composition. In some embodiments, the polymer derived from one or more ethylenically-unsaturated monomers comprises at least 20% by weight of the composition (e.g., at least 25% by weight of the composition, at least 30% by weight of the composition, at least 35% by weight of the composition, at least 40% by weight of the composition, at least 45% by weight of the composition, at least 50% by weight of the composition, at least 55% by weight of the composition, at least 60% by weight of the composition; at least 65% by weight of the composition, at least 70% by weight of the composition, at least 75% by weight of the composition, at least 80% by weight of the composition, at least 85% by weight of the composition, or at least 90% by weight of the composition). In some embodiments, the polymer derived from one or more ethylenically-unsaturated monomers comprises 95% or less of the composition by weight (e.g., 90% or less by weight, 85% or less by weight, 80% or less by weight, 75% or less by weight, 70% or less by weight, 65% or less by weight, 60% or less by weight, 55% or less by weight, 50% or less by weight, 45% or less by weight, 40% or less by weight, 35% or less by weight, 30% or less by weight, 25% or less by weight, 20% or less by weight, 15% or less by weight, or 10% or less by weight). The rosin ester can be present in the composition in an amount ranging from any of the minimum values above to any of the maximum values above. In some embodiments, the polymer derived from one or more ethylenically-unsaturated monomers is present in the composition in an amount ranging from 20% to 60% by weight, based on the total weight of the composition (e.g., from 30% to 40% by weight).

In certain embodiments, the weight ratio of the polymer derived from one or more ethylenically-unsaturated monomers to the total amount of esterified dehydroabietic acid and esterified dihydroabietic acid in the composition is at least 1:2.2 (e.g., at least 1:2.1, at least 1:2.0, at least 1:1.9, at least 1:1.8, at least 1:1.7, at least 1:1.6, at least 1:1.5, at least 1:1.4, at least 1:1.3, at least 1:1.2, at least 1:1.1, at least 1:1, at least 1.1:1, at least 1.2:1, at least 1.3:1, at least 1.4:1, at least 1.5:1, at least 1.6:1, at least 1.7:1, at least 1.8:1, at least 1.9:1, at least 2:1, at least 2.1:1, at least 2.2:1, at least 2.3:1, at least 2.4:1, at least 2.5:1, at least 2.6:1, at least 2.7:1, at least 2.8:1, at least 2.9:1, at least 3:1, at least 3.1:1, at least 3.2:1, at least 3.3:1, at least 3.4:1, at least 3.5:1, at least 3.6:1, at least 3.7:1, at least 3.8:1, at least 3.9:1, at least 4:1, at least 4.1:1, or at least 4.2:1). In certain embodiments, the weight ratio of the polymer derived from one or more ethylenically-unsaturated monomers to the total amount of esterified dehydroabietic acid and esterified dihydroabietic acid in the composition is 4.3:1 or less (e.g., 4.2:1 or less, 4.1:1 or less, 4:1 or less, 3.9:1 or less, 3.8:1 or less, 3.7:1 or less, 3.6:1 or less, 3.5:1 or less, 3.4:1 or less, 3.3:1 or less, 3.2:1 or less, 3.1:1 or less, 3:1 or less, 2.9:1 or less, 2.8:1 or less, 2.7:1 or less, 2.6:1 or less, 2.5:1 or less, 2.4:1 or less, 2.3:1 or less, 2.2:1 or less, 2.1:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, 1.1:1 or less, 1:1 or less, 1:1.1 or less, 1:1.2 or less, 1:1.3 or less, 1:1.4 or less, 1:1.5 or less, 1:1.6 or less, 1:1.7 or less, 1:1.8 or less, 1:1.9 or less, 1:2 or less, or 1:2.1 or less). The weight ratio of the polymer derived from one or more ethylenically-unsaturated monomers to the total amount of esterified dehydroabietic acid and esterified dihydroabietic acid in the composition can range from any of the minimum values above to any of the maximum values above. For example, in some embodiments, the weight ratio of the polymer derived from one or more ethylenically-unsaturated monomers to the total amount of esterified dehydroabietic acid and esterified dihydroabietic acid in the composition is from 1:2.2 to 4.3:1 (e.g., from 1:1.1 to 2:1).

In some cases, the polymeric composition can be an adhesive formulation (e.g., hot-melt adhesive formulation), an ink formulation, a coating formulation, a rubber formulation, a sealant formulation, an asphalt formulation, or a pavement marking formulation (e.g. a thermoplastic road marking formulation).

In certain embodiments, the composition is a hot-melt adhesive. In these embodiments, the rosin ester can function as all or a portion of the tackifier component in a traditional hot-melt adhesive formulation. The polymer derived from one or more ethylenically-unsaturated monomers (e.g., a polymer derived from vinyl acetate such as EVA), the rosin ester, and one or more additional components, can be present in amounts effective to provide a hot-melt adhesive having the characteristics required for a particular application. For example, the polymer derived from one or more ethylenically-unsaturated monomers (e.g., a polymer derived from vinyl acetate such as EVA), can be from 10% by weight to 60% by weight of the hot-melt adhesive composition (e.g., from 20% by weight to 60% by weight of the hot-melt adhesive composition, from 25% by weight to 50% by weight of the hot-melt adhesive composition, or from 30% by weight to 40% by weight of the hot-melt adhesive composition). The rosin ester can be from 20% by weight to 50% by weight of the hot-melt adhesive composition (e.g., from 25% by weight to 45% by weight of the hot-melt adhesive composition, or from 30% by weight to 40% by weight of the hot-melt adhesive composition).

The hot-melt adhesive can further include one or more additional components, including additional tackifiers, waxes, stabilizers (e.g., antioxidants and UV stabilizers), plasticizers (e.g., benzoates and phthalates), paraffin oils, nucleating agents, optical brighteners, pigments dyes, glitter, biocides, flame retardants, anti-static agents, anti-slip agents, anti-blocking agents, lubricants, and fillers. In some embodiments, the hot-melt adhesive further comprises a wax. Suitable waxes include paraffin-based waxes and synthetic Fischer-Tropsch waxes. The waxes can be from 10% by weight to 40% by weight of the hot-melt adhesive composition, based on the total weight of the composition (e.g., from 20% by weight to 30% by weight of the hot-melt adhesive composition).

In certain embodiments, the composition is a hot-melt adhesive and the polymer derived from one or more ethylenically-unsaturated monomers is EVA. In certain embodiments, the EVA can be derived from 10% by weight to 40% by weight vinyl acetate, based on the total weight of all of the monomers polymerized to form the EVA (e.g., from 17% by weight to 34% by weight vinyl acetate).

In certain embodiments, the composition is a thermoplastic road marking formulation. The thermoplastic road marking formulation can include from 5% by weight to 25% by weight of a rosin ester, based on the total weight of the thermoplastic road marking formulation (e.g., from 10% by weight to 20% by weight of the thermoplastic road marking formulation). The thermoplastic road marking formulation can further include a polymer derived from one or more ethylenically-unsaturated monomers (e.g., a polymer derived from vinyl acetate such as EVA) which can be, for example, from 0.1% by weight to 1.5% by weight of the thermoplastic road marking formulation. The thermoplastic road marking formulation can further include a pigment (e.g., from 1% by weight to 10% by weight titanium dioxide), and glass beads (e.g., from 30% by weight to 40% by weight), and a filler calcium carbonate which can make up the balance of the composition up to 100% by weight). The thermoplastic road marking formulation can further include an oil (e.g., from 1% by weight to 5% by weight percent mineral oil), a wax (e.g., from 1% by weight to 5% by weight percent paraffin-based wax or synthetic Fischer-Tropsch wax), a stabilizer (e.g., from 0.1% by weight to 0.5% by weight stearic acid), and, optionally, additional polymers and/or binders other than the rosin ester described herein.

In some embodiments, by incorporating a rosin ester described herein into the polymeric composition, the polymeric composition can exhibit improved thermal stability, including improved viscosity stability on aging at elevated temperatures (thermal aging), improved color stability on thermal aging, or combinations thereof.

In some embodiments, the polymeric compositions provided herein exhibit less than a 10% change in viscosity upon incubation at 177° C. for 96 hours, when analyzed using the modified ASTM D4499-07 method described below (e.g., less than a 9% change in viscosity, less than an 8% change in viscosity, less than a 7.5% change in viscosity, less than a 7% change in viscosity, less than a 6% change in viscosity, less than a 5% change in viscosity, less than a 4% change in viscosity, less than a 3% change in viscosity, less than a 2.5% change in viscosity, less than a 2% change in viscosity, or less than a 1% change in viscosity). In some embodiments, the composition exhibits substantially no change in viscosity (i.e., less than a 0.5% change in viscosity) upon incubation at 177° C. for 96 hours.

In some embodiments, the polymeric compositions provided herein exhibit color stability upon thermal aging. In certain cases, the polymeric compositions provided herein exhibit a change of 5 or less Gardner color units when heated to a temperature of 177° C. for a period of 96 hours (e.g., 4.5 or less, 4.0 or less, 3.5 or less, 3.0 or less, 2.5 or less, 2.0 or less, 1.5 or less, 1.0 or less, or 0.5 or less).

The polymeric compositions provided herein can be used in a variety of applications, including as adhesives (e.g., hot-melt adhesives), inks, coatings, rubbers, sealants, asphalt, and thermoplastic road markings and pavement markings. In some embodiments, the compositions are hot-melt adhesives used, for example, in conjunction with papers and packaging (e.g., to adhere surfaces of corrugated fiberboard boxes and paperboard cartons during assembly and/or packaging, to prepare self-adhesive labels, to apply labels to packaging, or in other applications such as bookbinding), in conjunction with non-woven materials (e.g., to adhere nonwoven material with a backsheet during the construction of disposable diapers), in adhesive tapes, in apparel (e.g., in the assembly of footwear, or in the assembly of multi-wall and specialty handbags), in electrical and electronic bonding (e.g., to affix parts or wires in electronic devices), in general wood assembly (e.g., in furniture assembly, or in the assembly of doors and mill work), and in other industrial assembly (e.g., in the assembly of appliances). The rosin esters described herein can also be used in a variety of additional applications, including as a softener and plasticizer in chewing gum bases, as a weighting and clouding agent in beverages (e.g., citrus flavored beverages), as a surfactant, surface activity modulator, or dispersing agent, as an additive in waxes and wax-based polishes, as a modifier in cosmetic formulations (e.g., mascara), and as a curing agent in concrete.

Also provided are compositions comprising a rosin ester described herein and an oil. Exemplary compositions can include 25% by weight to 55% by weight (e.g., 30% by weight to 50% by weight) of a rosin ester described herein and 45% by weight to 75% by weight (e.g., 50% by weight to 70% by weight) of an oil, such as mineral oil or polybutene oil.

Also provided are methods of making the rosin esters described herein. Methods of making rosin esters can comprise (a) esterifying a rosin with an alcohol to provide a crude rosin ester composition, and (b) hydrogenating the crude rosin ester composition to form the rosin ester.

Esterification step (a) can comprise contacting a rosin with a suitable alcohol, and allowing the rosin and the alcohol to react for a period of time and under suitable conditions to form the crude rosin ester. Methods of esterifying rosin are known in the art. See, for example, U.S. Pat. No. 5,504,152 to Douglas et al., which is hereby incorporated by reference in its entirety. Suitable methods for esterifying rosin can be selected in view of a number of factors, including the nature of the reactants (e.g., the chemical and physical properties of the rosin, the identity of the alcohol, etc.) and the desired chemical and physical properties of the resultant rosin ester. For example, rosin can be esterified by a thermal reaction of the rosin with an alcohol. Esterification can comprise contacting the rosin with the alcohol at an elevated temperature (e.g., at a temperature from greater than greater than 30° C. to 250° C.). In some embodiments, esterification step (a) can involve contacting molten rosin with an alcohol and optionally an esterification catalyst for a period of time suitable to form the crude rosin ester. In some cases, the esterification reaction involves contacting the rosin with an alcohol and optionally an esterification catalyst for a period of time effective to provide a rosin ester having an acid number of 15 or less.

Any suitable rosin can be used in esterification step (a). The rosin can be a tall oil rosin, a gum rosin, a wood rosin, or a combinations thereof. In certain embodiments, the rosin comprises tall oil rosin. Rosins can be used as a feedstock for the formation of rosin esters as obtained from a commercial or natural source. Examples of commercially available rosins include tall oil rosins such as SYLVAROS® 90, commercially available from Arizona Chemical. Alternatively, rosin can be subjected to one or more purification steps (e.g., distillation under reduced pressure, extraction, and/or crystallization) prior to its use as a feedstock for the formation of rosin esters.

Any suitable alcohol, include monoalcohols, diols, and other polyols, can be used in esterification step (a). Examples of suitable alcohols include glycerol, pentaerythritol, dipentaerythritol, ethylene glycol, diethylene glycol, triethylene glycol, sorbitol, neopentylglycol, trimethylolpropane, methanol, ethanol, propanol, butanol, amyl alcohol, 2-ethyl hexanol, diglycerol, tripentaerythritol, $C_8$-$C_{11}$ branched or unbranched alkyl alcohols, and $C_7$-$C_{16}$ branched or unbranched arylalkylalcohols. In certain embodiments, the alcohol is a polyhydric alcohol selected from the group consisting of ethylene glycol, propylene glycol, diethylene glycol, triethylene glycol, tetraethylene glycol, trimethylene glycol, glycerol, trimethylolpropane, trimethylolethane, pentaerythritol, mannitol, and combinations thereof. In some embodiments, more than one alcohol is used in esterification step (a). In certain embodiments, pentaerythritol and one or more additional alcohols selected from the group consisting of glycerol, dipentaerythritol, ethylene glycol, diethylene glycol, triethylene glycol, trimethylolpropane, and combinations thereof are used in esterification step (a).

The amount of alcohol employed in esterification step (a) relative to the amount of rosin can be varied, depending on the nature of the alcohol and the desired chemical and physical properties of the resultant rosin ester. In some embodiments, the rosin is provided in excess so as to produce a resultant rosin ester having a low hydroxyl number. For example, the alcohol can be provided in an amount such that less than a molar equivalent of hydroxy groups is present in the reaction relative to the amount of rosin present. In other embodiments, the alcohol is provided in excess so as to produce a resultant rosin ester having a low acid number.

As is known in the art, catalysts, solvents, bleaching agents, stabilizers, and/or antioxidants can be added in esterification step (a). Suitable catalysts, solvents, bleaching agents, stabilizers, and antioxidants are known in the art, and described, for example, in U.S. Pat. Nos. 2,729,660, 3,310, 575, 3,423,389, 3,780,013, 4,172,070, 4,548,746, 4,690,783, 4,693,847, 4,725,384, 4,744,925, 4,788,009, 5,021,548, and 5,049,652. In order to drive the esterification reaction to completion, water can be removed from the reactor using standard methods, such as distillation and/or application of a vacuum.

Hydrogenation step (b) can comprise contacting the crude rosin ester with a hydrogenation catalyst. Methods of hydrogenating rosin esters are known in the art. Hydrogenation reactions can be carried out using a catalyst, such as a heterogeneous hydrogenation catalyst (e.g., a palladium catalyst, such as Pd supported on carbon (Pd/C), a platinum catalyst, such as $PtO_2$, a nickel catalyst, such as Raney Nickel (Ra—Ni), a rhodium catalyst, or a ruthenium catalyst). In some cases, the hydrogenation catalyst can be present in an amount ranging from 0.25% to 5% by weight, based on the total weight of the crude rosin ester. The hydrogen source for the hydrogenation can by hydrogen ($H_2$) or a compound which can generate hydrogen under reaction conditions, such as formic acid, isopropanol, cyclohexene, cyclohexadiene, a diimide, or hydrazine.

Step (b) can be performed at an elevated temperature, an elevated pressure, or combinations thereof. For example, step (b) is performed at a temperature ranging from 150° C. to 300° C. (e.g., from 180° C. to 280° C., from 180° C. to 240° C., from 200° C. to 280° C. or from 220° C. to 260° C.). Step (b) can performed at a pressure ranging from 250 to 2000 psi (e.g., from 250 to 1450 psi, from 250 to 650 psi, or from 350 to 550 psi).

Optionally a solvent can be present in esterification step (a), hydrogenation step (b), or combinations thereof. In certain embodiments, the rosin esterified in step (a) and/or the crude rosin ester composition hydrogenated in step (b) comprise less than 25% by weight solvent. In some embodiments, the concentration of esterified rosin acids in the crude rosin ester composition hydrogenated in step (b) is 75% or more by weight, based on the total weight of the crude rosin ester composition. In some embodiments, the crude rosin ester composition is substantially free of solvent (e.g., the crude rosin ester composition comprises less than by weight solvent, based on the total weight of the crude rosin ester composition). In certain embodiments, the crude rosin ester composition hydrogenated in step (h) has a viscosity of 1,000 cP or less at 25° C.

In some embodiments, the crude rosin ester composition obtained from esterification step (a) is hydrogenated in step (b) without an intervening distillation step. In certain embodiments, the crude rosin ester composition obtained from esterification hydrogenated in step (b) without any intervening purification step. For example, the crude rosin ester composition obtained from esterification step (a) can be directly hydrogenated in step (b).

In some cases, methods of making the rosin esters described herein include only a single hydrogenation step. In some embodiments, methods of making the rosin esters described herein consist essentially of esterifying step (a) and hydrogenating step (b). In such cases, the methods involve no additional processing steps which influence the weight ratio of esterified dehydroabietic acid to esterified dihydroabietic acid in the rosin ester, such as dehydrogenation, hydrogenation of the rosin prior to esterification (i.e., pre-hydrogenation), disproportionation of the rosin prior to esterification (i.e., pre-disproportionation), distillation, the use of additional/alternative catalysts, or combinations thereof. In certain embodiments, methods of making the rosin esters described herein consist of esterifying step (a) and hydrogenating step (b).

To obtain a rosin ester having the desired chemical and physical properties for particular applications, methods of making the rosin esters described herein can optionally further include one or more additional processing steps in addition to esterifying step (a) and hydrogenating step (b). In some embodiments, the rosin to be esterified in step (a), the crude rosin ester, and/or the rosin ester can be further processed, for example, to decrease the PAN number of the rosin, crude rosin ester, and/or rosin ester; to influence the weight ratio of various rosin acids and/or rosin acid esters present in the rosin, crude rosin ester, and/or rosin ester; to influence the hydroxyl number of the resultant rosin ester; to influence the acid number of the resultant rosin ester; or combinations thereof. Suitable additional processing steps are known in the art, and can include additional hydrogenation steps, dehydrogenation, disproportionation, dimerization, and fortification. In certain embodiments, rosin is processed using one or more of these methods prior to esterifying step (a) to improve the chemical and physical properties of the resultant rosin esters. Where chemically permissible, such methods can also be performed in combination with esterifying step (a), following esterifying step (a) but prior to hydrogenating step (b), following hydrogenating step (b), or combinations thereof to obtain a rosin ester having the desired chemical and physical properties, as discussed in more detail below.

In certain embodiments, the methods of making rosin esters can further comprise disproportionating the rosin prior to the esterifying step (a). Rosin disproportionation converts abietadienoic acid moieties into dehydroabietic acid and dihydroabietic acid moieties. Methods of disproportionation are known in the art, and can involve heating rosin, often in the presence of one or more disproportionation agents. Suitable methods for disproportionating rosin are described in, for example, U.S. Pat. Nos. 3,423,389, 4,302,371, and 4,657,703, all of which are incorporated herein by reference.

A variety of suitable disproportionation agents can be used. Examples of suitable disproportionation agents include thiobisnaphthols, including 2,2'thiobisphenols, 3,3'-thiobisphenols, 4,4'-thiobis(resorcinol) and t,t'-thiobis(pyrogallol), 4,4'-15 thiobis(6-t-butyl-m-cresol) and 4/4'-thiobis (6-t-butyl-o-cresol) thiobisnaphthols, 2,2'-thio-bisphenols, 3,3'-thio-bis phenols; metals, including palladium, nickel, and platinum; iodine or iodides (e.g., iron iodide); sulfides (e.g., iron sulfide); and combinations thereof. In certain embodiments, the rosin is disproportionate using a phenol sulfide type disproportionation agent. Examples of suitable phenol sulfide type disproportionation agents include poly-t-butylphenoldisulfide (commercially available under the trade name ROSINOX® from Arkema, Inc.), 4,4'thiobis(2-t-butyl-5-methylphenol (commercially available under the trade name LOWINOX® TBM-6 from Chemtura), nonylphenol disulfide oligomers (such as those commercially available under the trade name ETHANOX® TM323 from Albemarle Corp.), and amylphenol disulfide polymer (such as those commercially available under the trade name VULTAC® 2 from Sovereign Chemical Co.).

In certain embodiments, the rosin is disproportionated prior to esterifying step (a). In these embodiments, a disproportionated rosin or partly disproportionated rosin can be used as a feedstock for esterifying step (a). In some cases, disproportionation or further disproportionation can be conducted during esterifying step (a). For example, disproportionated or partly disproportionated rosin can be generated in situ and esterified thereafter in a one-pot synthesis procedure to a rosin ester.

Optionally, the rosin, crude rosin ester, and/or rosin ester can be fortified to improve the chemical and physical properties of the resultant rosin esters. In some embodiments, rosin is fortified prior to esterifying step (a) to improve the chemical and physical properties of the resultant rosin esters. Fortification of rosin involves the chemical modification of the conjugated double bond system of rosin acids in the rosin, so as to provide a rosin having a lower PAN number and higher molecular weight than the rosin prior to fortification. A number of suitable chemical modifications and related chemical methods are known in the art. For example, rosins can be fortified by means of a Diels-Alder or Ene addition reaction of a rosin acid with a dienophile, such as an $\alpha,\beta$-unsaturated organic acid or the anhydride of such an acid. Examples of suitable dienophiles include maleic acid, fumaric acid, acrylic acid, esters derived from these acids, and maleic anhydride.

Optionally, methods can include one or more process steps to influence the hydroxyl number of the resultant rosin ester, to influence the acid number of the resultant rosin ester; or combinations thereof. If desired, rosin esters can be chemically modified following esterification (e.g., following esterifying step (a) but prior to hydrogenating step (b) or following hydrogenating step (b)) to provide a rosin ester having a low hydroxyl number. This process can involve chemical modification of residual hydroxyl moieties in the crude rosin ester or rosin esters following esterification using synthetic methods known in the art. For example, the crude rosin ester or rosin ester can be reacted with an acylating agent (e.g., a carboxylic acid or a derivative thereof, such as an acid anhydride). See, for example, U.S. Pat. No. 4,380,513 to Ruckel. Residual hydroxyl moieties in the crude rosin ester or rosin ester can also be reacted with an electrophilic reagent, such as an isocyanate, to produce the corresponding carbamate derivative. See, for example, U.S. Pat. No. 4,377,510 to Ruckel. Other suitable electrophilic reagents which can be used to react residual hydroxyl moieties include alkylating agents (e.g., methylating agents such as dimethylsulphate). If desired, following esterification (e.g., following esterifying step (a) but prior to hydrogenating step (b) or following hydrogenating step (b)), unreacted rosin as well as other volatile components, can be removed from the crude rosin ester or rosin ester, for example, by steam sparging, sparging by an inert gas such as nitrogen gas, wiped film evaporation, short path evaporation, and vacuum distillation. By stripping excess rosin (i.e., rosin acids) from the crude rosin ester or rosin ester, the acid number of the resultant rosin ester can be reduced.

Also provided are methods for preparing polymer compositions, including hot-melt adhesives. Methods for preparing polymer compositions can include mixing a polymer derived from vinyl acetate and a rosin ester as described herein (e.g., a rosin ester comprising at least 70% by weight of an esterified dehydroabietic acid and an esterified dihydroabietic acid, wherein the weight ratio of the esterified dehydroabietic acid to the esterified dihydroabietic acid ranges from 1.3:1 to 1:2.6). Methods can further include adding one or more additional components to the composition, such as an additional tackifier, a wax, a stabilizer (e.g., an antioxidant UV stabilizer), a plasticizer (e.g., benzoates, phthalates), paraffin oil, a nucleating agent, an optical brightener, a pigment, a dye, glitter, a biocide, a flame retardant, an anti-static agent, an anti-slip agent, an anti-blocking agent, a lubricants, a filler, or a combination thereof. Methods can further include preparing a rosin ester (e.g., a rosin ester comprising at least 70% by weight of an esterified dehydroabietic acid and an esterified dihydroabietic acid, wherein the weight ratio of the esterified dehydroabietic acid to the esterified dihydroabietic acid ranges from 1.3:1 to 1:2.6) using the methods described herein.

An exemplary road marking formulation may be prepared by: (a) charging a standard mixer with 16 parts rosin ester, 2.8 parts oil (e.g., a mineral oil, such as mineral oil; obtained from Statoil), 1 part wax (e.g., polyethylene wax, such as AC6 PE-wax obtained from Honeywell), 1 part of a polymer derived from vinyl acetate (e.g., poly(ethylene-co-vinyl acetate) such as Elvax 22W obtained from DuPont), 0.2 parts fatty acid (e.g., stearic acid), 5.3 parts pigment (e.g., titanium dioxide, such as titanium dioxide obtained from Kronos), 42.4 parts filler (e.g., calcium carbonate), and 37.1 parts reflective filler (e.g., glass beads, such as glass beads obtained from Swarco); and (b) heating (e.g., at 180° C.) and blending at low speed to avoid introducing air bubbles into the melt.

By way of non-limiting illustration, examples of certain embodiments of the present disclosure are included below.

EXAMPLES

General Methods

All materials were characterized using the following methods unless otherwise stated. Hydroxyl numbers were determined according to a modified method (different solvent tetrahydrofuran was applied) of DIN 53240-2 entitled "Determination of Hydroxyl Value—Part 2: Method with Catalyst," which is incorporated herein by reference in its entirety. The rosin ester (dissolved in tetrahydrofuran) was reacted with acetic anhydride in the presence of 4-dimethylaminopyridine (DMAP). Residual acetic anhydride was hydrolyzed and the resulting mixture titrated with an alcoholic solution of potassium hydroxide (0.5 M). The hydroxyl number is expressed as mg KOH per gram rosin ester sample. Acid numbers were determined according to method described in ASTM D465-05 (2010) entitled "Standard Test Methods for Acid Number of Naval Stores Products Including Tall Oil and Other Related Products," which is incorporated herein by reference in its entirety. The acid number is expressed as mg KOH per gram rosin ester sample. Softening points were determined according to method described in ASTM E28-99 (2009) entitled "Standard Test Methods for Softening Point of Resins Derived from Naval Stores by Ring-and-Ball Apparatus," which is incorporated herein by reference in its entirety. The Gardner color of all materials was measured according to the Gardner Color scale as specified in ASTM D1544-04 (2010) entitled "Standard Test Method for Color of Transparent Liquids (Gardner Color Scale)," which is incorporated herein by reference in its entirety. Gardner colors were measured using a Dr Lange LICO® 200 colorimeter. Unless otherwise indicated, all Gardner colors were measured using neat samples. Oxidative-induction time was measured according to the standard methods specified in ASTM D5483-05(2010) entitled "Standard Test Method for Oxidation Induction Time of Lubricating Greases by Pressure Differential Scanning Calorimetry," which is incorporated herein by reference in its entirety. Unless otherwise specified, the oxidative-induction time was measured at 130° C. using 550 psi of oxygen. Sulfur content was measured according to the standard methods described in ASTM D5453-05 entitled "Standard Test Method for Determination of Total Sulfur in Light Hydrocarbons, Motor Fuels and Oils by Ultraviolet Fluorescence," which is incorporated herein by reference in its entirety. Sulfur content was measured using an ANTEK® 9000 sulfur analyzer.

The isomeric composition of the rosin esters, including the PAN number and the ratio of esterified dehydroabietic acid to esterified dihydroabietic acid, was determined according to the methods described in ASTM D5974-00 (2010) entitled "Standard Test Methods for Fatty and Rosin Acids in Tall Oil Fractionation Products by Capillary Gas Chromatography," which is incorporated herein by reference in its entirety. Specifically, a rosin ester sample (1.00 g) and 10 mL 2N potassium hydroxide (KOH) in ethanol were added to a high pressure microwave reaction vessel. The reaction vessel was sealed and placed into the rotor of a Perkin Elmer MULTIWAVE® 3000 Microwave System. The sample was saponified in the microwave for 30 minutes at 150° C. Upon completion of the microwave-assisted saponification, the reaction mixture was transferred to a separatory funnel, and dilute hydrochloric acid was added to reduce the pH value to less than 4. This converted the rosin soaps in the reaction mixture to rosin acids. The resulting rosin acids were isolated by way of ethyl ether extraction. Upon removal of the ether solvent, the rosin acids were derivatized and analyzed using a gas chromatograph according to ASTM D5974-00 (2010).

Preparation of Rosin Esters

Example 1

500 g of tall oil rosin (SYLVAROS® HYR, commercially available from Arizona Chemical) with a Gardner color (neat) of 5.5 and an acid number of 180.7 was charged into a four-necked flask (2 L) and heated to 200° C. under a nitrogen atmosphere. After the rosin was completely melted, the rosin was agitated, and pentaerythritol (57.4 g) and IRGANOX® 1425 (1.98 g) were added. The reaction mixture was heated to 275° C. (heating rate of 30° C./hour) and left at this temperature for 7.5 hours. The crude rosin ester was discharged, and analyzed to have a with a Gardner color (neat) of 5.6, an acid number of 13.8, softening point of 97.1° C., and an oxidative-induction time of 0.5 minutes.

Without further purification, the crude rosin ester was hydrogenated for 6 hours at 650 psi and 260° C. using 2% by weight palladium on carbon (5% Pd by weight). The catalyst was then removed by filtration, providing a rosin ester with a Gardner color (neat) of 1.4, an acid number of 11.2, softening point of 98.0° C., and an oxidative-induction time of 39.6 minutes. The color stability of the rosin ester was also tested. After incubation for three hours at 160° C., the rosin ester exhibited a Gardner color (neat) of 1.4. The weight ratio of esterified dehydroabietic acid to esterified dihydroabietic acid in the resulting rosin ester was determined to be 1:1.6.

Example 2

The procedure of Example 1 was repeated, except that a solvent was added during the hydrogenation reaction.

The crude rosin ester was prepared as described in Example 1. Without further purification, the crude rosin ester was hydrogenated for 6 hours at 650 psi and 260° C. using 2% by weight palladium on carbon (5% Pd by weight) in a 50% by weight solution of dimethylcyclohexane. The catalyst was then removed by filtration, and the solvent was removed by distillation. The resulting rosin ester exhibited a Gardner color (neat) of 0.8, an acid number of 11.4, softening point of 97.4° C., a PAN number of 0, and an oxidative-induction time of 43.0 minutes. The color stability of the rosin ester was also tested. After incubation for three hours at 160° C., the rosin ester exhibited a Gardner color (neat) of 0.8. The weight ratio of esterified dehydroabietic acid to esterified dihydroabietic acid in the resulting rosin ester was determined to be 1:1.6.

Example 3

500 g of tall oil rosin was charged into a four-necked flask (1 L). The flask was placed under vacuum for 10-15 minutes. The vacuum was then broken with nitrogen, and the flask was heated to 180° C. and agitated. ROSINOX® (poly-t-butylphenoldisulfide 1.74 g, 0.31 wt %, commercially available from Arkema, Inc) was added to the reaction flask. The reaction flask contents were then stirred for 5-10 minutes. A catalyst (calcium-bis(((3,5-bis(1,1-dimethylethyl)-4-hydroxyphenyl)methyl)-ethylphosphonate), 1.98 g) and pentaerytritol (57.4 g) were added, and the reaction was heated to 270° C. at a rate of 35° C. per hour. The reaction temperature was maintained at 275° C. until the acid number of the mixture was less than 15. The crude rosin ester was discharged.

Without further purification the crude rosin ester was hydrogenated for 6 hours at 450 psi and 260° C. using 1.5% by weight palladium on carbon (5% Pd by weight). The catalyst was then removed by filtration in toluene, and the solvent was removed by distillation. The resulting rosin ester exhibited a Gardner color (neat) of 2.3, an acid number of 10, softening point of 96° C., and an oxidative-induction time of 44.4 minutes. The weight ratio of esterified dehydroabietic acid to esterified dihydroabietic acid in the resulting rosin ester was determined to be 1.01:1.

Formulation of Hot-Melt Adhesives

Hot-melt adhesives were formulated using the rosin esters prepared in Examples 1 and 2. The hot-melt adhesive compositions were prepared by blending 20 wt % ESCORENE® Ultra UL 7711 EVA (EVA copolymer with a 26.7 wt % vinyl acetate content, commercially available from Exxon Mobil Chemical), 16.4 wt % ELVAX® EVA (EVA copolymer with a 28 wt % vinyl acetate content, commercially available from DuPont), 25 wt % SASOL-WAX® H1 (unmodified Fischer-Tropsch was commercially available from Sasolwax), 38 wt % tackifier (rosin ester), and 0.6% ANOX® 20 (3,5-bis(1,1-dimethylethyl)-4-hydroxy-benzenepropanoic acid, sterically hindered phenolic antioxidant commercially available from Gulf Stabilizers Industries). For comparison, hot melt adhesives were also prepared using SYLVAPACK® RE 100RC (tall oil rosin ester with a Gardner color (neat) of 4, an acid number of 11, softening point of 93-100° C., and a weight ratio of esterified dehydroabietic acid to esterified dihydroabietic acid of 1:0.4; commercially available from Arizona Chemical) and SYLVALITE® RE 105XL (tall oil rosin ester with a Gardner color (neat) of 4, an acid number of 2, softening point of 102° C., and a weight ratio of esterified dehydroabietic acid to esterified dihydroabietic acid in the resulting rosin ester was determined to be 1:0.3; commercially available from Arizona Chemical).

The thermal stability of the hot-melt adhesive formulations was measured using a thermal stability test adapted from the test methods described in ASTM D4499-07, entitled "Standard Test Method for Heat Stability of Hot-Melt Adhesives," which is incorporated by reference in its entirety. The viscosity of the hot-melt adhesives was measured using a Brookfield viscometer equipped with a #27 spindle at 133° C. and 177° C. The viscosity is measured in centipoise (cP).

The viscosity of each composition was measured at 0 hours, 48 hours, and 96 hours. The neat Gardner color of each composition was also measured at 0 hours, 24 hours, 48 hours, 72 hours, and 96 hours. The results are shown in Table 1 below.

TABLE 1

Performance of Hot-Melt Adhesive Formulations Containing Rosin Esters

| Tackifer | Time (hours) | Garnder Color (neat) | Δ Color[1] | Viscosity (cP)[2] | Δ Viscosity[3] |
|---|---|---|---|---|---|
| Example 1 | 0 | 1.5 | | 985 | |
| | 24 | 3 | | | |
| | 48 | 4 | | 992 | |
| | 72 | 5 | | | |
| | 96 | 6.5 | 5 | 1008 | 2.3% |
| Example 2 | 0 | 1.5 | | 1025 | |
| | 24 | 2 | | | |
| | 48 | 3.5 | | 1010 | |
| | 72 | 4.5 | | | |
| | 96 | 5.5 | 4 | 1020 | 0.5% |
| RE 100RC | 0 | 3.5 | | 1082 | |
| | 24 | 5 | | | |
| | 48 | 5.5 | | 1092 | |
| | 72 | N/A | | | |
| | 96 | 8 | 4.5 | 1258 | 16.0% |
| RE 105XL | 0 | 2.5 | | 1092 | |
| | 24 | 4.5 | | | |
| | 48 | 6 | | 952 | |
| | 72 | N/A | | | |
| | 96 | 9.5 | 7 | 998 | 8.6% |

[1] Δ Color denotes the difference between the intial Gardner color of the composition (measured at 0 hours) and the final Gardner color of the composition (measured at 96 hours) measured according to the method described in ASTM D1544-04 (2010).
[2] Viscosity measured at 177° C. using a Brookfield viscometer equipped with a #27 spindle
[3] Δ Viscosity denotes the percent difference between the initial viscosity of the composition (measured at 0 hours) and the final viscosity of the composition (measured at 96 hours) measured according to the method described in ASTM 4499-07.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A rosin ester comprising at least 70% by weight of an esterified dehydroabietic acid and an esterified dihydroabietic acid, wherein the weight ratio of the esterified dehydroabietic acid to the esterified dihydroabietic acid ranges from 1.3:1 to 1:2.6, wherein the rosin ester has a weight average molecular weight of at least 800 g/mol as determined using gel permeation chromatography as described in ATSM D5296-05.

2. The rosin ester of claim 1, wherein the rosin ester is derived from tall oil rosin, gum rosin, wood rosin, or a combination thereof.

3. A composition comprising
   (a) a polymer derived from one or more ethylenically-unsaturated monomers, or a blend of two or more polymers derived from one or more ethylenically-unsaturated monomers, and
   (b) a rosin ester defined by claim 1.

4. A method of making a rosin ester comprising:
   (a) esterifying a rosin with an alcohol to provide a crude rosin ester, and
   (b) hydrogenating the crude rosin ester to form the rosin ester,
   wherein the rosin ester has a weight average molecular weight of at least 800 g/mol as determined using gel permeation chromatography as described in ATSM D5296-05.

5. A composition comprising
   (a) 45% by weight to 75% by weight of an oil, and
   (b) 25% by weight to 55% by weight of a rosin ester defined by claim 1.

6. A composition comprising a rosin ester, the rosin ester comprising at least 70% by weight of an esterified dehydroabietic acid and an esterified dihydroabietic acid, wherein the weight ratio of the esterified dehydroabietic acid to the esterified dihydroabietic acid ranges from 1.3:1 to 1:2.6 and wherein the rosin ester has a weight average molecular weight of at least 800 g/mol as determined using gel permeation chromatography as described in ATSM D5296-05.

* * * * *